United States Patent [19]
Hall

[11] Patent Number: 5,482,618
[45] Date of Patent: Jan. 9, 1996

[54] FLOW-THROUGH, IN-LINE FILTER HOUSING

[75] Inventor: James C. Hall, San Jose, Calif.

[73] Assignee: Systems Chemistry, Inc., Milpitas, Calif.

[21] Appl. No.: 276,925

[22] Filed: Jul. 19, 1994

[51] Int. Cl.⁶ ................................. B01D 35/14
[52] U.S. Cl. ........................ 210/85; 210/446; 210/450; 210/456
[58] Field of Search ............................. 210/85, 446, 450, 210/453, 455, 456; 55/274, 418, 502; 285/93

[56] References Cited

U.S. PATENT DOCUMENTS

| | | | |
|---|---|---|---|
| 4,476,023 | 10/1984 | Horikoshi et al. | 210/446 |
| 5,013,433 | 5/1991 | Shalon | 210/198.2 |
| 5,090,871 | 2/1992 | Story et al. | 417/9 |

*Primary Examiner*—Matthew O. Savage
*Attorney, Agent, or Firm*—Claude A. S. Hamrick

[57] ABSTRACT

A flow-through, in-line filter housing including a cylindrical barrel for receiving a removable filter element, a filter element adaptor, and end cap assembly for engaging one end of the barrel, and a input flow diffuser and end cap assembly for engaging the opposite end of the barrel.

11 Claims, 2 Drawing Sheets

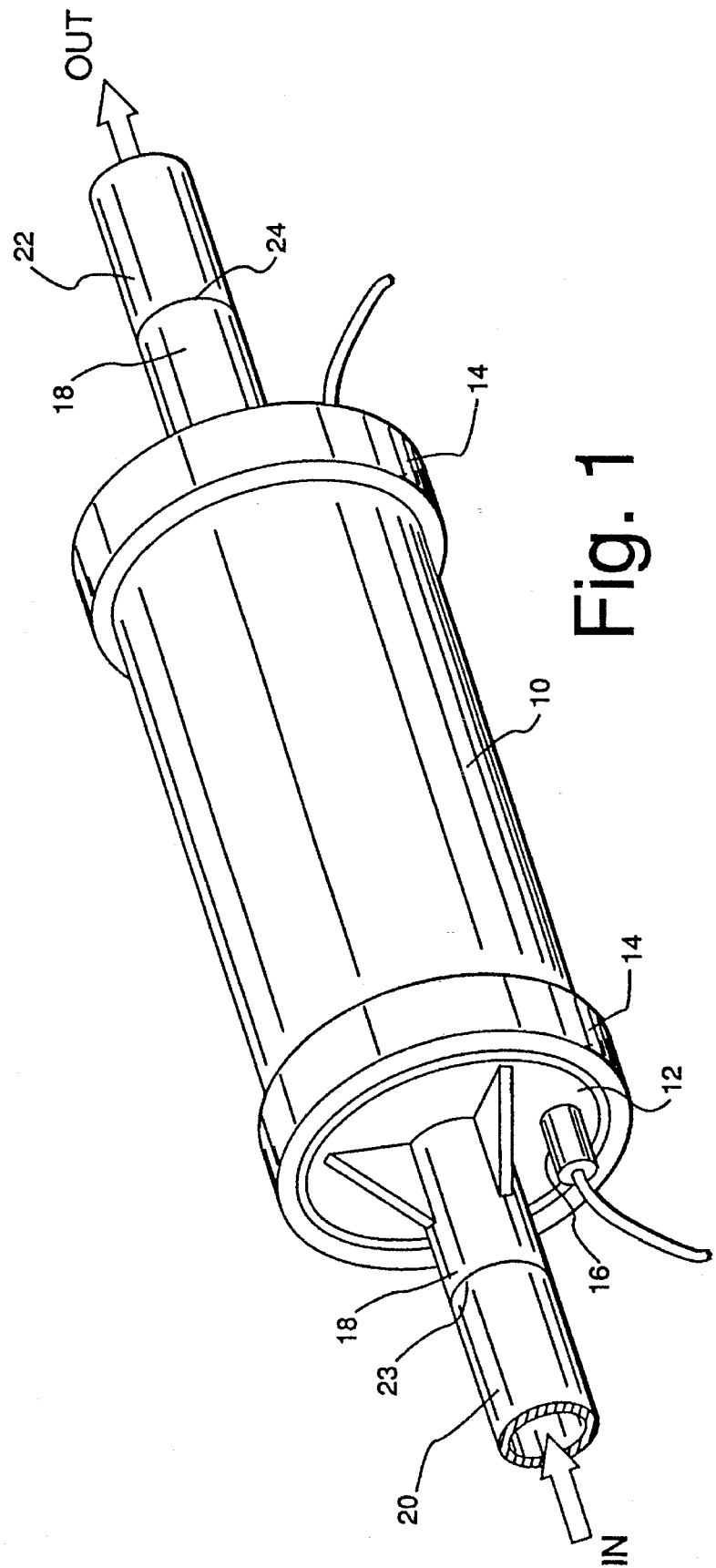

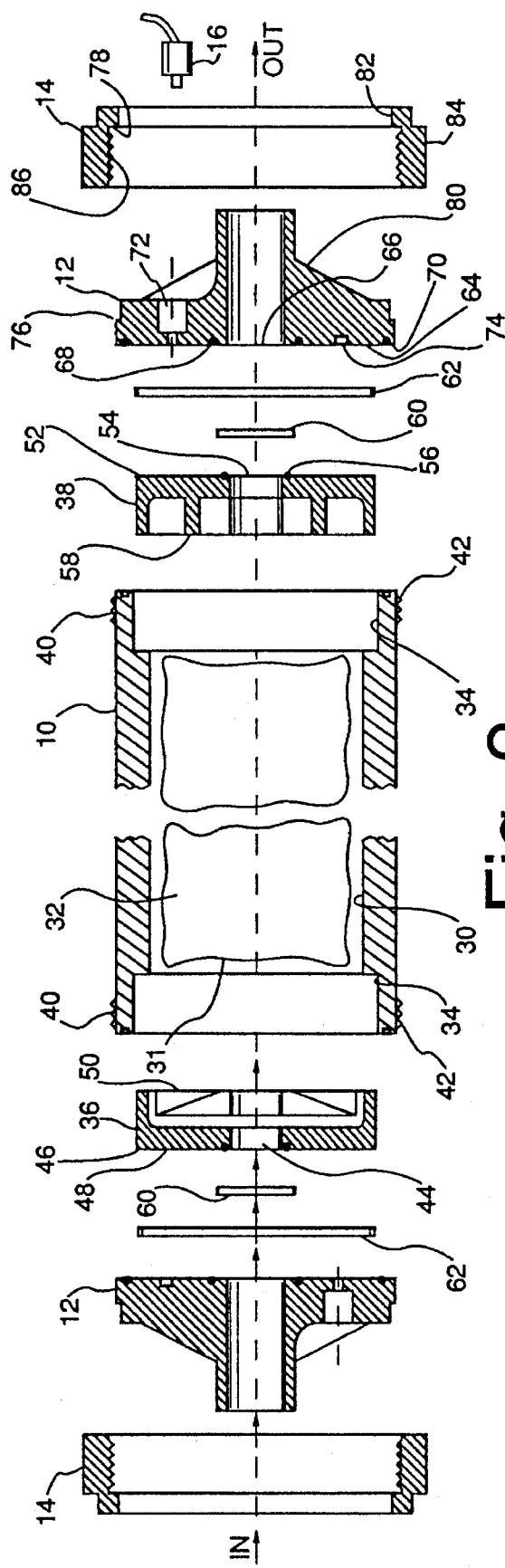
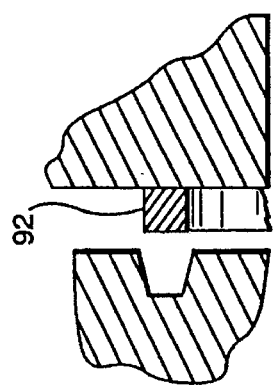
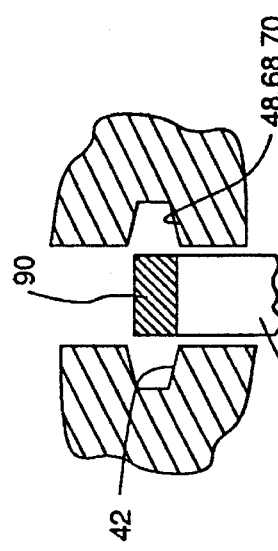

FLOW-THROUGH, IN-LINE FILTER HOUSING

BACKGROUND OF THE INVENTION

1. Field of the Invention

The present invention relates generally to filter apparatus, and more particularly to an improved in-line filter device having a removable filter element, double sealing and leak trace capability.

2. Brief Description of the Prior Art

While in-line filters have long been used in water lines, fuel lines, chemical supply lines, etc., such filter elements have typically involved a canister-type design with a removable top or bottom, allowing replacement of a filter element, or in the alternative have utilized a sealed filter container of the throw-away type with couplings at either end. There is thus a need for a new filter design which, while having good filter characteristics also allows simple filter removal and replacement, and is designed to facilitate filter replacement and includes leak trace capability.

One approach to providing a leak detection junction between sealable surfaces is disclosed in U.S. Pat. No. 5,090,871 entitled "Junction Assembly With Leak Detection Means".

SUMMARY OF THE INVENTION

It is therefore a principal objective of the present invention to provide an improved in-line filter device suiting the above needs.

Briefly, a presently preferred embodiment of the present invention includes a cylindrical barrel for receiving a removable filter element, a filter element adaptor and end cap assembly for engaging one end of the barrel, and an input flow diffuser and end cap assembly for engaging the opposite end of the barrel.

Among the advantages of the present invention is that it provides an in-line filter assembly which can be inserted directly into a fluid conduit without requiring multiple bends or redirection of the conduit or fluid flow.

Another advantage of the present invention is that it provides an in-line filter assembly having a removable barrel segment that can be easily removed by backing off two threaded nuts or other fasteners to accommodate easy removal and installation of a new filter medium.

These and other objects and advantages of the present invention will no doubt become apparent to those skilled in the art after having read the following detailed description of the preferred embodiment which is illustrated in the several figures of the drawing.

IN THE DRAWING

FIG. 1 is a perspective view illustrating a filter assembly in accordance with the present invention;

FIG. 2 is an exploded longitudinal, cross-sectional view illustrating the several components of the preferred embodiment;

FIG. 3 is a partial cross-sectional view illustrating seal configuration; and

FIG. 4 is a partial cross-sectional view illustrating an alternative seal configuration.

DETAILED DESCRIPTION OF THE PREFERRED EMBODIMENT

Referring now to FIG. 1 of the drawing, a flow-through in-line filter assembly is illustrated including a filter housing barrel 10, a pair of end caps 12, and a pair of coupling nuts 14. Extending into apertures formed in each end cap 12 (only one of which is shown) is a leak trace detector 16 which will be described below. As will also be further described below, the cylindrical nipples 18, formed integral with each end cap 12, may be either removably or fixably attached to an inlet conduit 20 and an outlet 22, as indicated at 23 and 24, respectively.

Turning now to FIG. 2 of the drawing, which is an exploded longitudinal cross-section of the embodiment depicted in FIG. 1, it will be noted that the barrel 10 is formed of an elongated cylindrical body having a first cylindrical bore 30 forming a chamber for receiving a filter element 32. At each end of the barrel 10 is a counter-bore 34 of a larger diameter than the bore 30, such bores being respectively adapted to receive an input flow diffuser 36 at one end and a filter element adaptor 38 at the other end. Each end of barrel 10 is preferably externally threaded, as indicated at 40, and includes an annular seal-receiving groove 42 formed in its end face.

The flow diffuser 36 is a circular body having a central aperture 44 for receiving an input flow of liquid or gas, and has an outer diameter suitable for mating with the bore 34 of barrel 10. The outer surface 46 on one side is smooth with the exception of an annular seal-receiving groove 48. The opposite side 50 is variously configured to form flow paths serving to diffuse the input flow of gas or liquid so that it is more or less evenly distributed over the input surface of the filter element 32.

The adaptor 38 is of similar size and configuration to that of diffuser 36 in that its outer diameter is adapted to mate with the bore 34 at the other end of barrel 10, and its outer surface 52 is smooth, with the exception of a central aperture 54 and an annular seal-receiving groove 56. The opposite side 58 of adaptor 38 is configured to suitably engage the downstream end of the filter element 32 and direct the filtered flow of gas or liquid through the opening 54.

Annular inner and outer seals 60 and 62 are respectively adapted to engage and seat within the inner annular grooves 48, 56 and the larger annular grooves 42.

The end caps 12 are identical to each other and have an outer diameter of approximately that of barrel 10, and a smooth face 64 on one side for mating with the faces 46, 52 of the diffuser 36 and adaptor 38, respectively. The faces 64 have an inner aperture 66 for receiving filtered fluid or gas, an inner groove 68 for mating with the inner sealing ring 60, an outer annular groove 70 for mating with the outer sealing ring 62, and a counter-bored opening 72 for receiving the leak trace sensor 16. In addition, an annular groove 74 is also provided which is in alignment and communication with the bore 72. The outer perimeter of the end caps 12 is also provided with a shoulder 76 for receiving a corresponding capture flange 78 of the end nuts 14. End caps 12 also include suitable stiffening webs 80.

The nuts 14 have a threaded inner bore 86 for mating with the threads 40 of barrel 10, and an end wall with an inner bore 82 forming the shoulder 78 for engaging the shoulder 76 of the end caps 12. The outer annular surface 84 of the nuts 14 may be multi-faceted, gnurled, or of any other suitable configuration for aiding in the rotation of the nut as it is threaded onto barrel 10.

The present invention can be implemented using any material suitable to the application. In the presently preferred embodiment the barrel 10, diffuser 36, adaptor 38, and end caps 12 are made of a PFA plastic. End nuts 14 are made of a PVDF plastic which is somewhat harder than the PFA. The inner and outer sealing rings 60 and 62 are made of a somewhat softer Teflon or PTFE plastic. The sealing rings 60 and 62 are of a rectangular cross-section, as indicated at 90 in FIG. 3, and the annular grooves 42 and 48, 68 and 70 are inwardly tapered, as indicated in FIG. 3, so as to form a compression seal with the rings 60 and 62.

In an alternative embodiment, the annular seal may be dispensed with in favor of an integrally formed or bonded sealing ring 92, as depicted in FIG. 4, which is bonded directly to the face of one of the members and adapted to mate with a facing groove of the opposite member.

In operation, with the end caps 12 mounted to opposing ends of an external conduit and spaced apart a distance slightly larger than the length of the barrel 10, it will be appreciated that the barrel containing a filter element 32, with diffuser 36 in place at one end and adaptor element 38 in place at the other end, and sealing rings 60 and 62 installed in their corresponding grooves 56 and 42, can be slipped into place between the faces 64 of the end caps 12, and the end caps can be drawn into sealing engagement with the ends of the barrel, and the diffuser and adaptor, by threading a pair of end nuts 14 onto the threads 40 of barrel 10. Similarly, when a filter needs changing, all one need do is back off the nuts 14, releasing the tension on the end caps, freeing the barrel and allowing its removal.

The apparatus may be used either with or without the leak trace sensor. If used without the leak tracer sensor 16, a plug would be provided in bore 72 to prevent leakage in the event of inner seal failure. If the leak trace sensor 16 is included, it will be appreciated that any failure of the inner seal 60 at either end will permit leakage into the annular channel 74 and immediately be communicated to the leak trace sensor 16 to be reported by a suitable monitoring apparatus. In the preferred embodiment, an optical sensor such as is disclosed in U.S. patent application Ser. No. 899,663 entitled "Optical Leak Detector and Position Sensor" may be used.

Although the present invention has been described above in terms of a specific embodiment, it is anticipated that alterations and modifications thereof will no doubt become apparent to those skilled in the art. For example, one might use clamping rings or other mechanisms in place of the threaded nuts 14. Moreover, the annular grooves 74 might be formed in the faces 46, 52 of the diffuser 36 and adaptor 38, respectively. It is therefore intended that the following claims be interpreted as covering all such alterations and modifications as fall within the true spirit and scope of the invention.

I claim:

1. A filter housing comprising:
   a cylindrical barrel forming a compartment for receiving a filter element and having first and second annular sealing surface portions respectively formed at each end thereof;
   a first disk-shaped body forming a flow diffuser adapted to mate with one end of said barrel and having a first planar surface on one side thereof with a first central orifice passing therethrough for receiving an inflow of fluid to be filtered and a third annular sealing surface portion on said first planar surface circumscribing said first central orifice, and flow-diffusing means formed on the side opposite said one side and communicating with said first central orifice for diffusing said input flow such that said flow is evenly distributed over an inlet surface of said filter element;
   a second disk-shaped body forming a filter element adaptor for engaging the opposite end of said barrel and having a second planar surface on one side thereof with a second central orifice passing therethrough and a fourth annular sealing surface portion on said second planar surface circumscribing said second central aperture;
   first and second annular sealing members of a first diameter;
   third and fourth annular sealing members of a second diameter less than said first diameter;
   a first end cap having a third planar surface formed on one side thereof and first conduit coupling means formed on the opposite side thereof, said third planar surface including
   a fifth annular sealing surface portion adapted to be sealingly engaged to said first annular sealing surface portion by said first annular sealing member, and
   a sixth annular sealing surface portion adapted to be sealingly engaged to said third annular sealing surface portion by said third annular sealing member
   said first end cap having a fluid communicating passageway extending therethrough from said third planar surface to said first conduit coupling means;
   a second end cap having a fourth planar surface formed on one side thereof and second conduit coupling means formed on the opposite side thereof said fourth planar surface including
   a seventh annular sealing surface portion adapted to be sealingly engaged to said second annular sealing surface portion by said second annular sealing member, and
   an eighth annular sealing surface portion adapted to be sealingly engaged to said fourth annular sealing surface by said fourth annular sealing member,
   said second end cap having a fluid communicating passageway extending therethrough from said fourth planar surface to said second conduit coupling means; and
   first fastening means for securing said first end cap to one end of said barrel, and second fastening means for securing said second end cap to the opposite end of said barrel.

2. A filter housing as recited in claim 1, wherein at least one of said first planar surface and said third planar surface have a first annular groove formed therein with a diameter less than said first diameter but greater than said second diameter, and a first leak trace sensor means disposed in communication with said first annular groove to detect leakage of fluid through said third annular sealing member.

3. A filter housing as recited in claim 2, wherein at least one of said second planar surface and said fourth planar surface have a second annular groove formed therein of a diameter less than said first diameter but greater than said second diameter, and a second leak trace sensor in fluid communication with said second annular groove to detect fluid leakage through said fourth sealing member.

4. A filter housing as recited in claim 1, wherein said barrel has external threads formed on each end thereof, and wherein said first and second fastening means include an internally threaded nut adapted to thread over each end of said barrel to draw one of said end caps into sealing engagement with a corresponding end of said barrel.

5. A filter housing as recited in claim 1, wherein said first and second annular sealing surface portions include annular grooves formed in the end faces of said barrel.

6. A filter housing as recited in claim 5, wherein said annular grooves taper inwardly from the end faces of said barrel and said first and second annular sealing members have a rectangular transverse cross-section.

7. A filter housing as recited in claim 1, wherein said third annular sealing surface portion is formed by an annular groove in said first planar surface.

8. A filter housing as recited in claim 7, wherein said annular groove is tapered inwardly from said first planar surface and said third annular sealing member is of a rectangular transverse cross-section.

9. A filter housing as recited in claim 1, wherein said fourth annular sealing surface portion includes an annular groove formed in said second planar surface.

10. A filter housing as recited in claim 9, wherein said fourth annular groove is tapered inwardly from said second planar surface and said fourth annular sealing member is of a rectangular transverse cross-section.

11. A filter housing as recited in claim 9, wherein said first and second and third and fourth annular sealing members are integrally formed with said first and second end caps.

\* \* \* \* \*